(12) United States Patent
Mabuchi et al.

(10) Patent No.: US 9,425,679 B2
(45) Date of Patent: Aug. 23, 2016

(54) INVERTER APPARATUS AND SOLAR POWER GENERATION SYSTEM

(71) Applicants: OMRON CORPORATION, Kyoto (JP); TOKYO INSTITUTE OF TECHNOLOGY, Tokyo (JP)

(72) Inventors: Masao Mabuchi, Shiga (JP); Kenji Kobayashi, Shiga (JP); Takao Mizokami, Shiga (JP); Yasuhiro Tsubota, Shiga (JP); Akihiro Funamoto, Kyoto (JP); Hideaki Fujita, Tokyo (JP)

(73) Assignees: OMRON CORPORATION, Kyoto (JP); TOKYO INSTITUTE OF TECHNOLOGY, Tokyo (JP)

( * ) Notice: Subject to any disclaimer, the term of this patent is extended or adjusted under 35 U.S.C. 154(b) by 628 days.

(21) Appl. No.: 13/792,993

(22) Filed: Mar. 11, 2013

(65) Prior Publication Data
US 2013/0307352 A1    Nov. 21, 2013

(30) Foreign Application Priority Data
May 15, 2012   (JP) .................................. 2012-111802

(51) Int. Cl.
*H02J 5/00* (2016.01)
*H02M 1/12* (2006.01)
*H02M 7/49* (2007.01)

(52) U.S. Cl.
CPC ............... *H02M 1/126* (2013.01); *H02J 5/00* (2013.01); *H02M 7/49* (2013.01); *Y02E 10/56* (2013.01)

(58) Field of Classification Search
CPC .... H02J 13/0041; H02J 13/0048; H02J 5/00; G06F 1/3203; G06F 1/26; Y04S 40/123; G04G 15/006; G05F 3/06; G05F 1/32; H01F 29/04; H02M 5/08; H02M 1/126; H02M 7/49; Y02E 10/56

USPC .................................................. 307/140, 151
See application file for complete search history.

(56) References Cited

U.S. PATENT DOCUMENTS 8,184,461 B2    5/2012   Mabuchi et al.
8,184,462 B2    5/2012   Mabuchi et al.
(Continued)

FOREIGN PATENT DOCUMENTS

CN    101834542    9/2010
CN    101911463    12/2010
(Continued)

OTHER PUBLICATIONS

Search report from E.P.O., mail date is Sep. 26, 2013.
(Continued)

*Primary Examiner* — Thienvu Tran
*Assistant Examiner* — Brian K Baxter
(74) *Attorney, Agent, or Firm* — Greenblum & Bernstein, P.L.C.

(57) ABSTRACT

An inverter apparatus comprising a first switch group that is connected to a DC power source and includes a first switch and a second switch connected in series; a capacitor that has one end thereof connected to a first connection point between the first switch and the second switch; a second switch group that is connected in parallel with the capacitor and includes a third switch and a fourth switch that are connected in series; a switch control section that controls an ON/OFF state of the first switch, the second switch, the third switch, and the fourth switch to convert DC voltage from the DC power source into AC voltage and output the AC voltage from a second connection point between the third switch and the fourth switch; and a smoothing circuit that is connected to the second connection point and normalizes a pulse waveform of the AC voltage.

15 Claims, 12 Drawing Sheets

(56) References Cited

U.S. PATENT DOCUMENTS

| | | | |
|---|---|---|---|
| 2003/0026118 A1* | 2/2003 | Ikimi | H02M 1/34 363/132 |
| 2005/0002212 A1* | 1/2005 | Okuma | H02J 9/062 363/50 |
| 2010/0232192 A1 | 9/2010 | Mabuchi et al. | |
| 2010/0328977 A1 | 12/2010 | Asplund | |
| 2011/0128763 A1 | 6/2011 | Iwata et al. | |
| 2011/0222323 A1 | 9/2011 | Dofnas et al. | |
| 2011/0222324 A1* | 9/2011 | Mabuchi | H02M 7/49 363/97 |
| 2013/0016543 A1* | 1/2013 | Ku | H02M 7/53871 363/71 |
| 2013/0107597 A1* | 5/2013 | Mabuchi | H02M 7/5395 363/124 |

FOREIGN PATENT DOCUMENTS

| | | |
|---|---|---|
| JP | 2010-220320 | 9/2010 |
| JP | 2010-220321 | 9/2010 |
| WO | 2008/102552 | 8/2008 |
| WO | 2010/069399 | 6/2010 |
| WO | 2011/093269 | 8/2011 |

OTHER PUBLICATIONS

China Office action, dated Feb. 2, 2015 along with an English translation thereof.

Office Action issued in Japan Counterpart Patent Appl. No. 2012-111802, dated Mar. 15, 2016, along with an English translation thereof.

\* cited by examiner

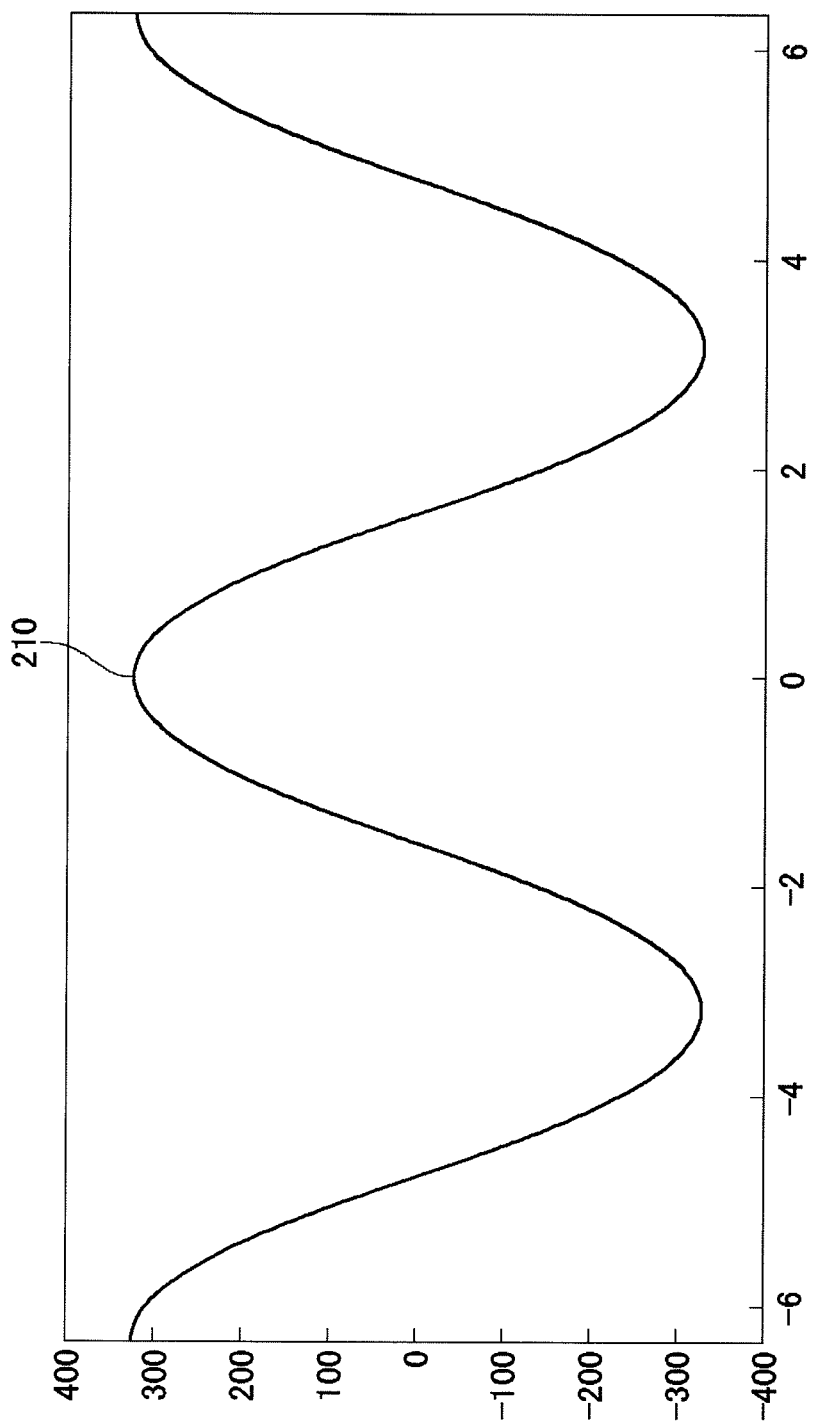

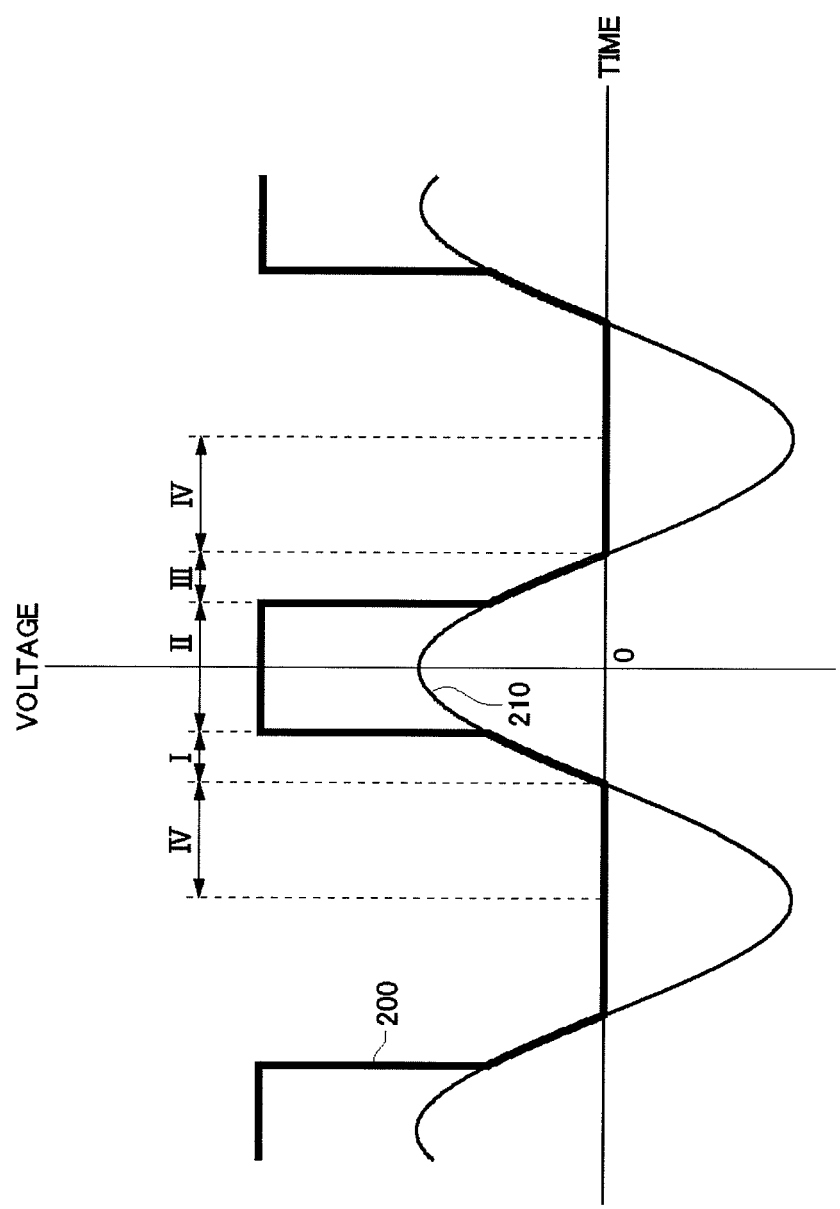

| INTERVAL | FIRST SWITCH | SECOND SWITCH | THIRD SWITCH | FOURTH SWITCH |
|---|---|---|---|---|
| I | ON/OFF | ON/OFF | ON | OFF |
| II | ON | OFF | ON/OFF | ON/OFF |
| III | ON/OFF | ON/OFF | ON | OFF |
| IV | OFF | ON | ON/OFF | ON/OFF |

*FIG.4*

| INTERVAL | FIRST SWITCH | SECOND SWITCH | THIRD SWITCH | FOURTH SWITCH |
|---|---|---|---|---|
| I | OFF | ON | ON/OFF | ON/OFF |
| II | ON/OFF | ON/OFF | ON | OFF |
| III | ON/OFF | ON/OFF | ON | OFF |
| IV | ON | OFF | OFF | ON |
| V | ON/OFF | ON/OFF | ON | OFF |
| VI | ON/OFF | ON/OFF | ON | OFF |
| VII | OFF | ON | ON/OFF | ON/OFF |

| INTERVAL | FIRST SWITCH | SECOND SWITCH | THIRD SWITCH | FOURTH SWITCH |
|---|---|---|---|---|
| I | OFF | ON | ON/OFF | ON/OFF |
| II | ON/OFF | ON/OFF | ON | OFF |
| III | ON/OFF | ON/OFF | OFF | ON |
| IV | ON | OFF | OFF | ON |
| V | ON/OFF | ON/OFF | OFF | ON |
| VI | ON/OFF | ON/OFF | ON | OFF |
| VII | OFF | ON | ON/OFF | ON/OFF |

*FIG.10*

INVERTER APPARATUS AND SOLAR POWER GENERATION SYSTEM

The contents of the following Japanese patent application are incorporated herein by reference: NO. 2012-111802 filed on May 15, 2012.

BACKGROUND

1. Technical Field

The present invention relates to an inverter apparatus and a solar power generation system.

2. Related Art

A power conditioner converts DC power from solar cells into AC power, by turning ON and OFF a plurality of switches forming an inverter circuit. Patent Documents 1 and 2 each disclose a power conditioner that improves the efficiency of the conversion from DC power to AC power by decreasing switching loss caused by the switches in the inverter circuit.

Patent Document 1: Japanese Patent Application Publication No. 2010-220320

Patent Document 2: Japanese Patent Application Publication No. 2010-220321

In these power conditioners, more efficient conversion of the DC power from the solar cells into AC power is desired.

SUMMARY

According to a first aspect of the present invention, provided is an inverter apparatus comprising a first switch group that is connected to a DC power source and includes a first switch and a second switch connected in series; a capacitor that has one end thereof connected to a first connection point between the first switch and the second switch; a second switch group that is connected in parallel with the capacitor and includes a third switch and a fourth switch that are connected in series; a switch control section that controls an ON/OFF state of the first switch, the second switch, the third switch, and the fourth switch to convert DC voltage from the DC power source into AC voltage and output the AC voltage from a second connection point between the third switch and the fourth switch; and a smoothing circuit that is connected to the second connection point and normalizes a pulse waveform of the AC voltage.

In the inverter apparatus, the switch control section may turn the first switch and the second switch ON and OFF in an alternating manner, and may turn the third switch and the fourth switch ON and OFF in an alternating manner. After turning the first switch and the second switch ON and OFF in an alternating manner and turning the third switch and the fourth switch ON and OFF in an alternating manner, the switch control section may turn the third switch and the fourth switch ON and OFF in an alternating manner while the first switch is OFF and the second switch is ON.

In the inverter apparatus, the switch control section may turn the first switch and the second switch ON and OFF in an alternating manner while the third switch is ON and the fourth switch is OFF, and may turn the third switch and the fourth switch ON and OFF in an alternating manner while the first switch is ON and the second switch is OFF. After turning the third switch and the fourth switch ON and OFF in an alternating manner while the first switch is ON and the second switch is OFF, the switch control section may turn the first switch and the second switch ON and OFF in an alternating manner while the third switch is ON and the fourth switch is OFF. After turning the first switch and the second switch ON and OFF in an alternating manner while the third switch is ON and the fourth switch is OFF, the switch control section may turn the third switch and the fourth switch ON and OFF in an alternating manner while the first switch is OFF and the second switch is ON.

The inverter apparatus may further comprise a voltage measuring section that measures voltage of a system power source connected on the output side of the smoothing circuit. The switch control section may determine a timing for switching from an operation of turning the first switch and the second switch ON and OFF in an alternating manner while the third switch is ON and the fourth switch is OFF to an operation of turning the third switch and the fourth switch ON and OFF in an alternating manner while the first switch is ON and the second switch is OFF, based on the voltage of the system power source.

The inverter apparatus may be connected to a three-phase AC power source. The switch control section may control the ON/OFF state of the first switch, the second switch, the third switch, and the fourth switch to output from the smoothing circuit shifted AC voltage obtained by shifting a reference AC voltage, with which the AC voltage is to be phase-synchronized, in a positive direction by a predetermined potential, from a reference potential of the reference AC voltage.

In the inverter apparatus, after turning the third switch and the fourth switch ON and OFF in an alternating manner while the first switch is OFF and the second switch is ON, the switch control section may turn the first switch and the second switch ON and OFF in an alternating manner while the third switch is ON and the fourth switch is OFF.

In the inverter apparatus, after turning the first switch and the second switch ON and OFF in an alternating manner while the third switch is ON and the fourth switch is OFF, the switch control section may turn ON the first switch, turn OFF the second switch, turn OFF the third switch, turn ON the fourth switch, and maintain the switches in this state.

In the inverter apparatus, if the state in which the first switch is ON, the second switch is OFF, the third switch is OFF, and the fourth switch is ON is maintained for an interval greater than $2\pi/3$, the switch control section may turn the first switch and the second switch ON and OFF in an alternating manner while the third switch is ON and the fourth switch is OFF and then, after turning the first switch and the second switch ON and OFF in an alternating manner while the third switch is OFF and the fourth switch is ON, turn ON the first switch, turn OFF the second switch, turn OFF the third switch, turn ON the fourth switch, and maintain the switches in this state.

In the inverter apparatus, after maintaining the state in which the first switch is ON, the second switch is OFF, the third switch is OFF, and the fourth switch is ON, the switch control section may turn the first switch and the second switch ON and OFF in an alternating manner while the third switch is ON and the fourth switch is OFF.

In the inverter apparatus, if the state in which the first switch is ON, the second switch is OFF, the third switch is OFF, and the fourth switch is ON is maintained for an interval greater than $2\pi/3$, the switch control section may turn ON the first switch, turn OFF the second switch, turn OFF the third switch, turn ON the fourth switch, maintain the switches in this state and then, after turning the first switch and the second switch ON and OFF in an alternating manner while the third switch is OFF and the fourth switch is ON, turn the first switch and the second switch ON and OFF in an alternating manner while the third switch is ON and the fourth switch is OFF.

In the inverter apparatus, after turning the first switch and the second switch ON and OFF in an alternating manner while the third switch is ON and the fourth switch is OFF, the switch control section may turn the third switch and the fourth switch ON and OFF in an alternating manner while the first switch is OFF and the second switch is ON.

According to a first aspect of the present invention, provided is a solar power generation system comprising a solar cell; and the inverter apparatus of the first aspect that converts DC voltage from the solar cell into AC voltage.

The summary clause does not necessarily describe all necessary features of the embodiments of the present invention. The present invention may also be a sub-combination of the features described above.

BRIEF DESCRIPTION OF THE DRAWINGS

FIG. 2C shows an exemplary reference AC voltage to be output from the power conditioner.

FIG. 3A shows an exemplary first voltage command value used in Control Technique 2.

FIG. 4 shows exemplary switching conditions for each of the switches in Control Technique 2.

FIG. 10 shows exemplary switching conditions for each of the switches in Control Technique 3.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
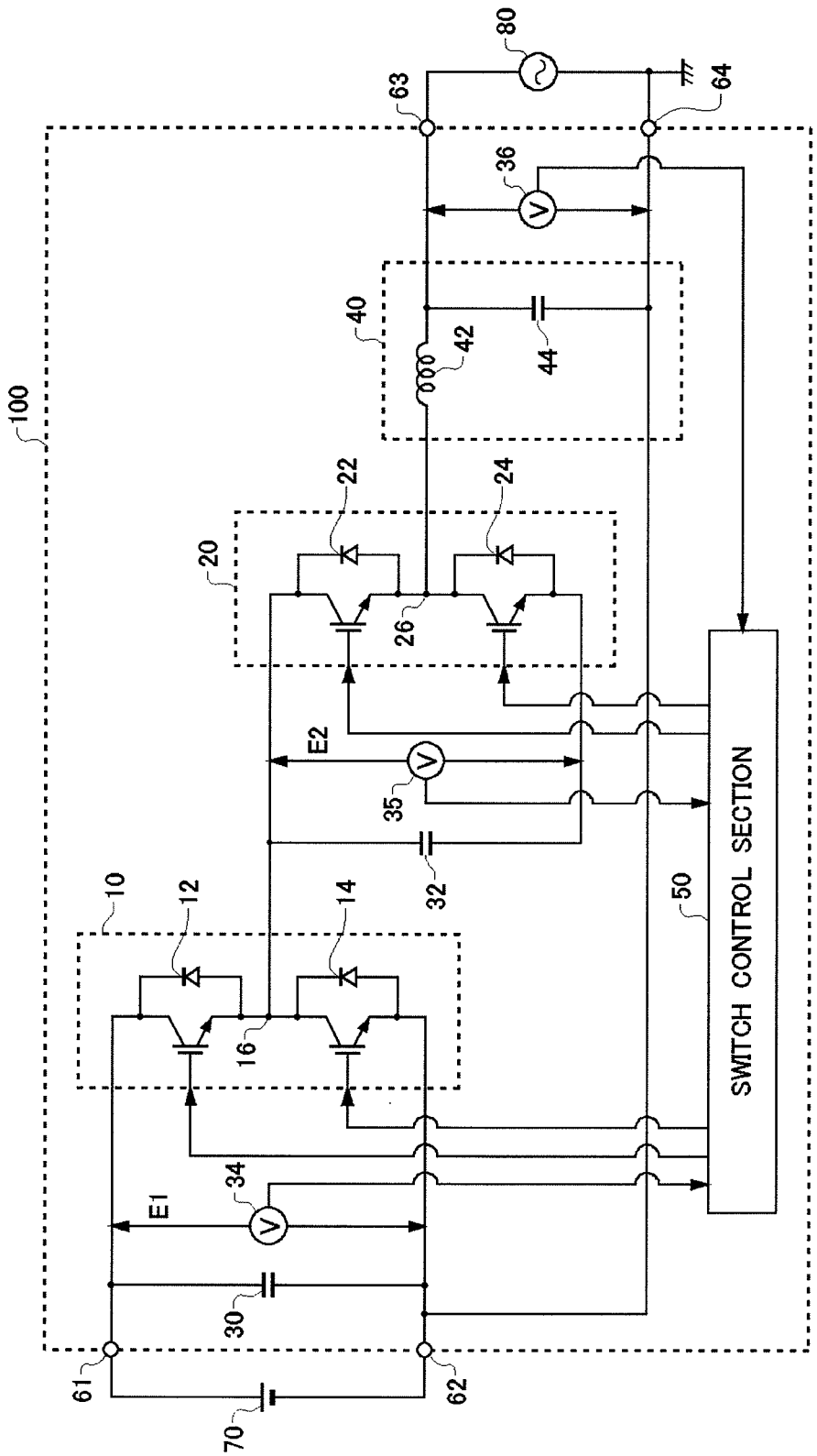
FIG. 1 shows a circuit configuration of a power conditioner according to an embodiment of the present invention.

FIG. 1 shows a circuit configuration of a power conditioner 100 according to an embodiment of the present invention. The power conditioner 100 is used in a solar power generation system, for example. The power conditioner 100 is one example of an inverter apparatus. The power conditioner 100 is connected to a DC power source 70 and a system power source 80. The DC power source 70 may be a solar cell, for example. The power conditioner 100 converts the DC voltage from the DC power source 70 into AC voltage, and operates together with the system power source 80.

The power conditioner 100 includes a first capacitor 30, a first switch group 10, a second capacitor 32, a second switch group 20, a smoothing circuit 40, a switch control section 50, a first voltage sensor 34, a second voltage sensor 35, and a third voltage sensor 36. The first capacitor 30 is connected in parallel with the DC power source 70, via an input terminal 61 at one end and an input terminal 62 at the other end, and normalizes the DC voltage output from the DC power source 70. The input terminal 62 is connected to a ground, which is a reference potential.

The first switch group 10 is connected in parallel with the DC power source 70 and the first capacitor 30. The first switch group 10 includes a first switch 12 and a second switch 14, which are connected in series. The first switch 12 and the second switch 14 may include switching elements such as a MOS field effect transistor or an insulated gate bipolar transistor (IGBT), for example. As another example, the first switch 12 and the second switch 14 may include diodes, and the diodes may be connected inversely in parallel to the switching elements. One end of the first switch 12 is connected to the input terminal 61, and the other end of the first switch 12 is connected to one end of the second switch 14. The other end of the second switch 14 is connected to the input terminal 62. In other words, the other end of the second switch 14 is connected to the ground.

One end of the second capacitor 32 is connected to a first connection point 16 between the first switch 12 and the second switch 14. The second switch group 20 is connected in parallel with the second capacitor 32. The second switch group 20 includes a third switch 22 and a fourth switch 24 that are connected in series. The third switch 22 and the fourth switch 24 may include switching elements such as a MOS field effect transistor or an insulated gate bipolar transistor (IGBT), for example. As another example, the third switch 22 and the fourth switch 24 may include diodes, and the diodes may be connected inversely in parallel to the switching elements. One end of the third switch 22 is connected to one end of the second capacitor 32. The other end of the third switch 22 is connected to one end of the fourth switch 24. The other end of the fourth switch 24 is connected to the other end of the second capacitor 32.

The switch control section 50 converts the DC voltage from the DC power source 70 into AC voltage by turning ON and OFF the first switch 12, the second switch 14, the third switch 22, and the fourth switch 24, and causes the AC voltage to be output from a second connection point 26 between the third switch 22 and the fourth switch 24. The smoothing circuit 40 is connected to the second connection point 26 and normalizes the pulse wave of the AC voltage. The smoothing circuit 40 includes a coil 42 and a third capacitor 44. One end of the coil 42 is connected to the second connection point 26, and the other end of the coil 42 is connected to one end of the third capacitor 44. The one end of the third capacitor 44 is also connected to an output terminal 63. The other end of the third capacitor 44 is connected to an output terminal 64. The other end of the third capacitor 44 is also connected to the ground.

The first voltage sensor 34 measures the voltage E1 of the DC power source 70 input to the power conditioner 100. The second voltage sensor 35 measures the voltage E2 of the second capacitor 32. The third voltage sensor 36 measures the AC voltage output from the power conditioner 100, which is the voltage of the system power source 80, i.e. the system voltage. The switch control section 50 performs PWM control of the first switch 12, the second switch 14, the third switch 22, and the fourth switch 24 based on voltage information acquired from the first voltage sensor 34, the second voltage sensor 35, and the third voltage sensor 36, thereby converting the DC voltage from the DC power source 70 into AC voltage having a phase in synchronization with the phase of reference AC voltage output by the system power source 80.

The following describes three Control Techniques by which the switch control section 50 performs ON/OFF control of the first switch 12, the second switch 14, the third switch 22, and the fourth switch 24.

<Control Technique 1>

During interval I, which is the half-period during which the reference AC voltage is positive, the switch control section 50 turns the first switch 12 and the second switch 14 ON and OFF in an alternating manner, and also turns the third switch 22 and the fourth switch 24 ON and OFF in an alternating manner. After turning the first switch 12 and the second switch 14 ON and OFF in an alternating manner and turning the third switch 22 and the fourth switch 24 ON and OFF in an alternating manner during the half-period in which the reference AC voltage is positive, the switch control section 50 turns the third switch 22 and the fourth switch 24 ON and OFF in an alternating manner while keeping the first switch 12 OFF and the second switch 14 ON during interval II, which is the half-period during which the reference AC voltage is negative.

Figure 2A:
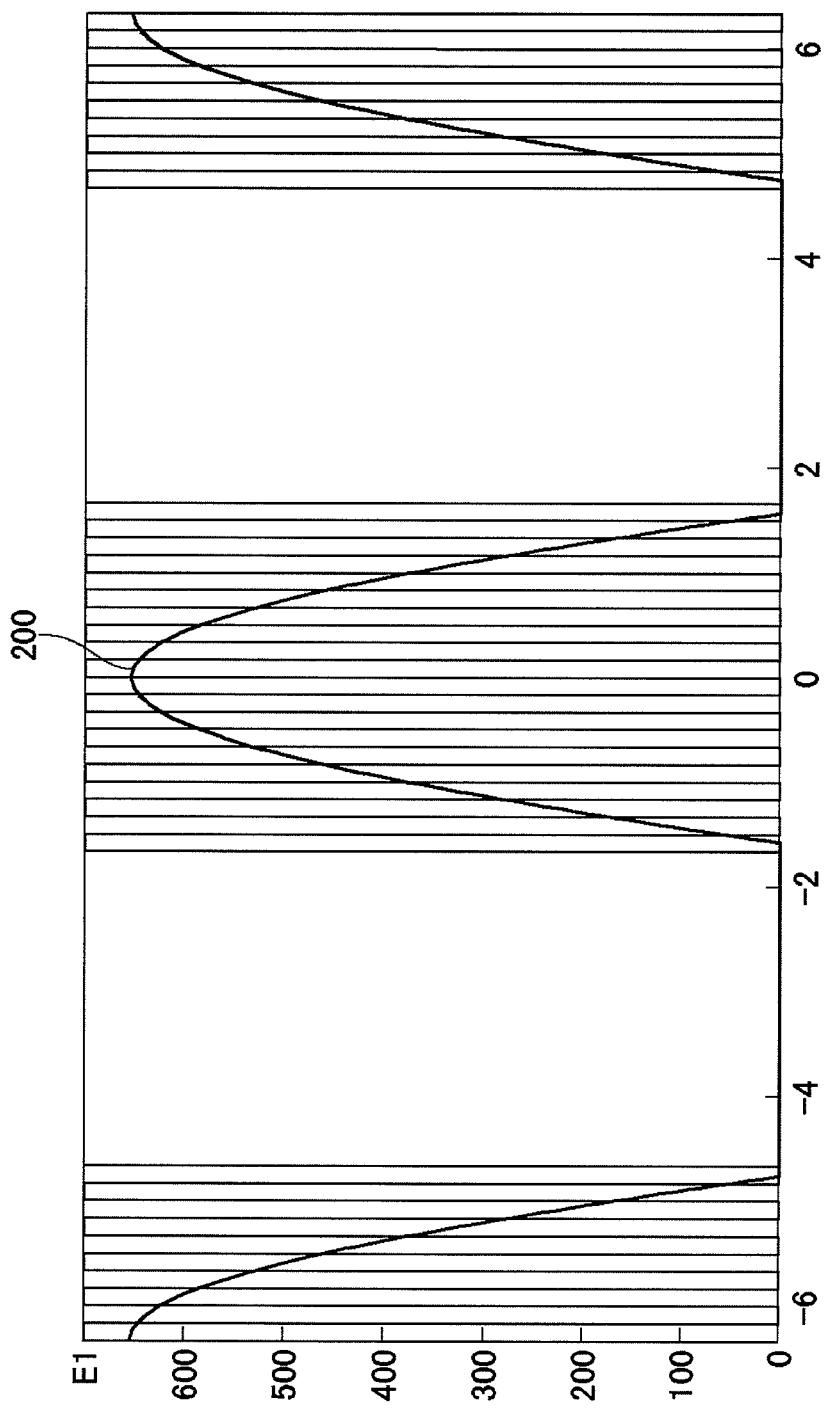
FIG. 2A shows an exemplary first voltage command value used in Control Technique 1.

The switch control section 50 turns the first switch 12 and the second switch 14 ON and OFF in an alternating manner based on a first voltage command value 200, such as shown in FIG. 2A, that indicates the positive half waveform having a phase synchronized with the phase of the reference AC voltage. When the first switch 12 is ON and the second switch 14 is OFF, the potential of the first connection point 16 is the potential of the input terminal 61, i.e. the voltage E1 of the DC power source 70. On the other hand, when the first switch 12 is OFF and the second switch 14 is ON, the potential of the first connection point 16 is the potential of the input terminal 62, i.e. the ground potential.

Figure 2B:
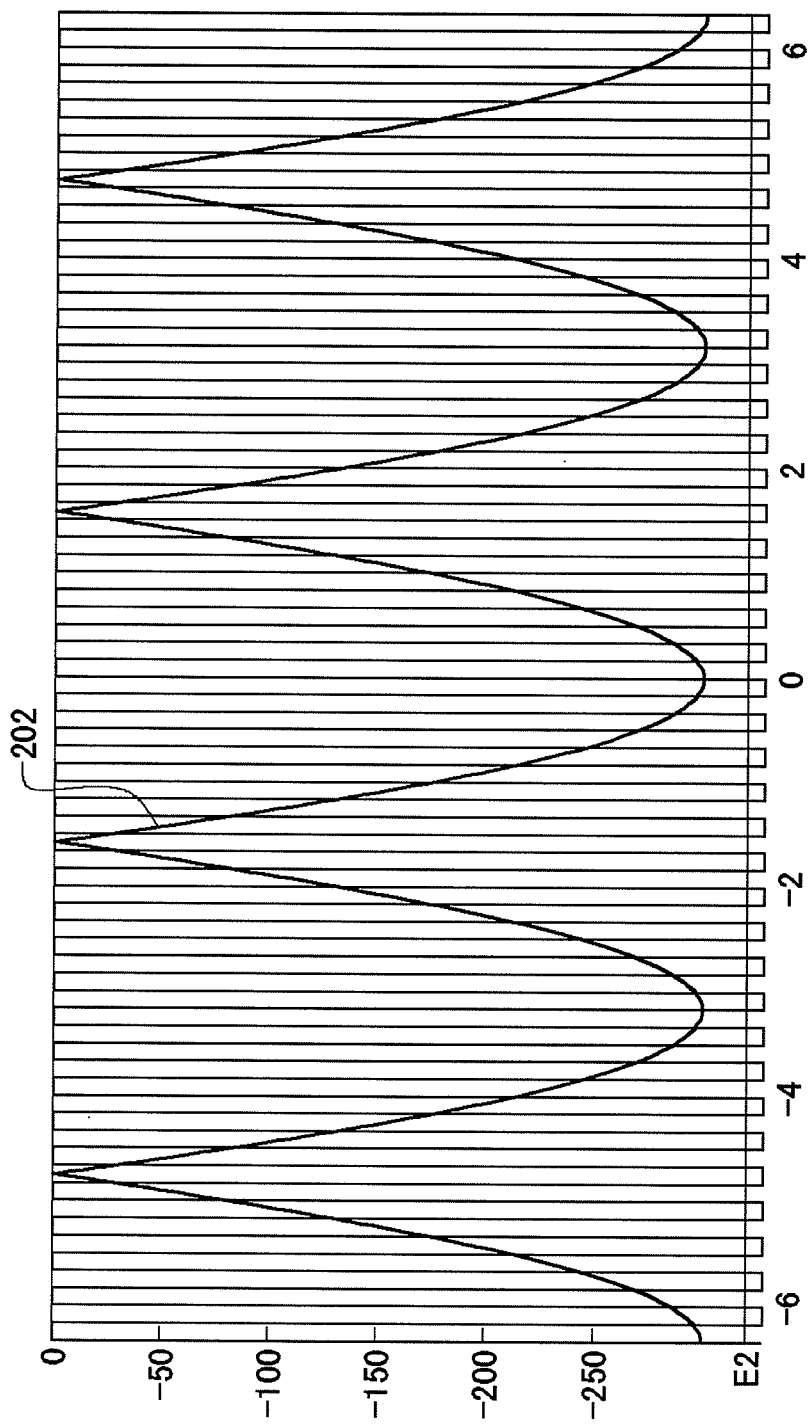
FIG. 2B shows an exemplary second voltage command value used in Control Technique 1.

The switch control section 50 turns the third switch 22 and the fourth switch 24 ON and OFF in an alternating manner based on a second voltage command value 202, such as shown in FIG. 2B, that indicates the negative half waveform having a phase synchronized with the phase of the reference AC voltage. When the third switch 22 is ON and the fourth switch 24 is OFF, the potential of the second connection point 26 is the potential at one end of the second capacitor 32, i.e. the potential of the first connection point 16. On the other hand, when the third switch 22 is OFF and the fourth switch 24 is ON, the potential of the second connection point 26 is a potential obtained by subtracting the potential difference between the ends of the second capacitor 32 (the voltage E2 of the second capacitor 32) from the potential of the first connection point 16.

Here, the maximum value of the voltage indicated by the first voltage command value 200 is double the maximum value of the reference AC voltage. On the other hand, the minimum voltage indicated by the second voltage command value 202 is the same as the minimum value of the reference AC voltage. Accordingly, the PWM control of the first switch 12 and the second switch 14 is based on the first voltage command value 200 and the PWM control of the third switch 22 and the fourth switch 24 is based on the second voltage command value 202, and therefore the power conditioner 100 can output AC voltage that is synchronized with the reference AC voltage, such as shown by reference numeral 210 in FIG. 2C.

Here, the first voltage command value 200 used in Technique 1 can be expressed as shown below.

Expression 1

$$v_{1ref} = \begin{cases} 2\sqrt{2}\, V_S \cos\theta & \left(-\frac{\pi}{2} < \theta < \frac{\pi}{2}\right) \quad \text{INTERVAL I} \\ 0 & \left(-\pi < \theta < -\frac{\pi}{2}\right) \\ & \left(\frac{\pi}{2} < \theta < \pi\right) \end{cases} \quad \text{INTERVAL II}$$

Furthermore, the second voltage command value 202 used in Technique 1 can be expressed as shown below.

Expression 2

$$v_{2ref} = \begin{cases} -\sqrt{2}\, V_S \cos\theta & \left(-\frac{\pi}{2} < \theta < \frac{\pi}{2}\right) \quad \text{INTERVAL I} \\ \sqrt{2}\, V_S \cos\theta & \left(-\pi < \theta < -\frac{\pi}{2}\right) \\ & \left(\frac{\pi}{2} < \theta < \pi\right) \end{cases} \quad \text{INTERVAL II}$$

Here, $v_{1ref}$ represents the first voltage command value, $v_{2ref}$ represents the second voltage command value, and $V_s$ represents the reference AC voltage.

The switch control section 50 determines a timing for switching between a state in which the first switch 12 and the second switch 14 are turned ON and OFF in an alternating manner while the third switch 22 is ON and the fourth switch 24 is OFF to a state in which the third switch 22 and the fourth switch 24 are turned ON and OFF in an alternating manner while the first switch 12 is ON and the second switch 14 is OFF, based on the voltage of the system power source measured by the third voltage sensor 36. More specifically, by detecting the zero-cross point of the voltage measured by the third voltage sensor 36, the switch control section 50 controls the timing for switching between interval I, during which the first switch 12 and the second switch 14 are turned ON and OFF in an alternating manner, and interval II, during which the first switch 12 is kept OFF and the second switch 14 is kept ON. Furthermore, the switch control section 50 controls the pulse width when performing PWM control by turning the first switch 12 and the second switch 14 ON and OFF in an alternating manner or turning the third switch 22 and the fourth switch 24 ON and OFF in an alternating manner such that the magnitude of the peak voltage of the voltage E2 of the second capacitor 32 measured by the second voltage sensor 35 is at least √2 times the magnitude of the reference AC voltage $V_s$.

With Control Technique 1, the power conditioner 100 can be used for a single-phase two-wire, single-phase three-wire, three-phase three-wire, or three-phase four-wire power source. Furthermore, with Control Technique 1, there is no need to perform ON/OFF control of the first switch 12 and the second switch 14 during the half-period where the reference AC voltage is negative. Accordingly, the switching loss that occurs due to the first switch 12 and second switch 14 being turned ON and OFF during the half-period where the reference AC voltage is negative can be eliminated.

<Control Technique 2>

Figure 3B:
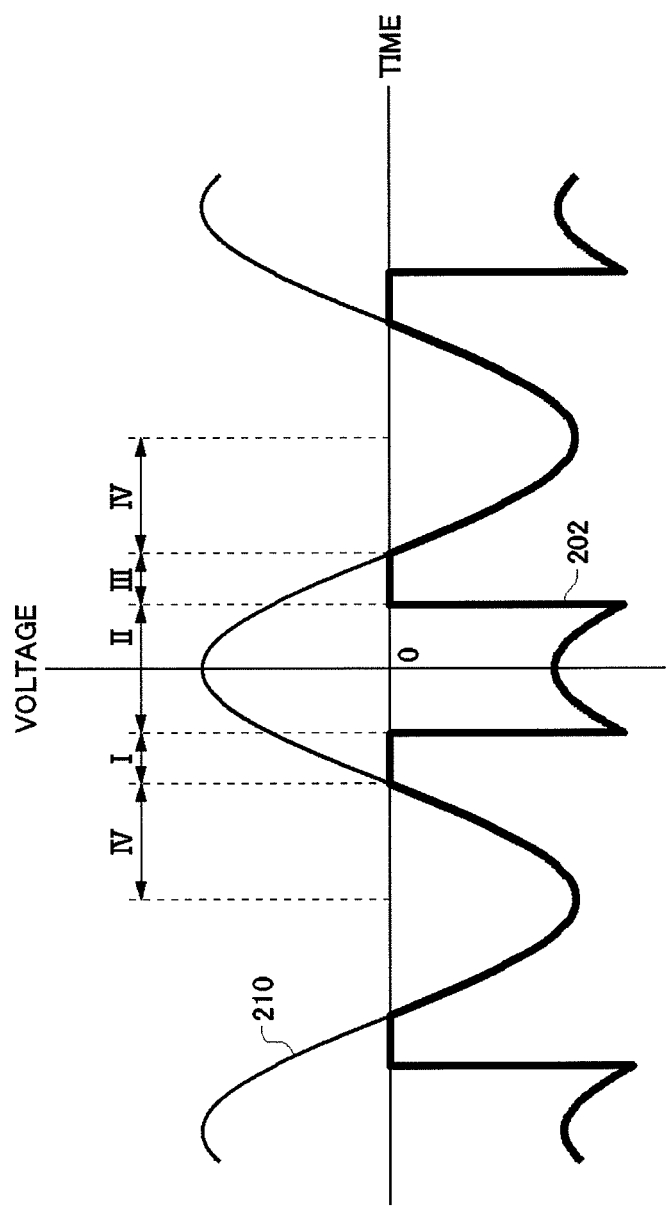
FIG. 3B shows an exemplary second voltage command value used in Control Technique 2.

The switch control section 50 turns the first switch 12, the second switch 14, the third switch 22, and the fourth switch 24 ON and OFF according to ON/OFF conditions, such as shown in FIG. 4, during each of the intervals I, II, III, and IV, based on the first voltage command value 200 shown in FIG. 3A and the second voltage command value 202 shown in FIG. 3B. In this way, the switch control section 50 converts the DC voltage from the DC power source 70 into a reference AC voltage to be output by the power conditioner 100, i.e. an AC voltage that is synchronized with the AC voltage output by the system power source 80.

The first voltage command value 200 used in Control Technique 2 can be expressed as shown below. The switch control section 50 performs PWM control of the first switch 12 and the second switch 14 during intervals I and III based on the first voltage command value 200.

Expression 3

$$v_{1ref} = \begin{cases} \sqrt{2}\, V_S \cos\theta & \left(-\frac{\pi}{2} < \theta < -\delta_1\right) & \text{INTERVAL I} \\ V_{in} & (-\delta_1 < \theta < \delta_1) & \text{INTERVAL II} \\ \sqrt{2}\, V_S \cos\theta & \left(\delta_1 < \theta < \frac{\pi}{2}\right) & \text{INTERVAL III} \\ 0 & \left.\begin{array}{l}\left(-\pi < \theta < -\frac{\pi}{2}\right) \\ \left(\frac{\pi}{2} < \theta < \pi\right)\end{array}\right\} & \text{INTERVAL IV} \end{cases}$$

Furthermore, the second voltage command value 202 used in Control Technique 2 can be expressed as shown below. The switch control section 50 performs PWM control of the third switch 22 and the fourth switch 24 during intervals II and IV based on the second voltage command value 202.

Expression 4

$$v_{2ref} = \begin{cases} 0 & \left(-\frac{\pi}{2} < \theta < -\delta_1\right) & \text{INTERVAL I} \\ \sqrt{2}\, V_S \cos\theta - V_{in} & (-\delta_1 < \theta < \delta_1) & \text{INTERVAL II} \\ 0 & \left(\delta_1 < \theta < \frac{\pi}{2}\right) & \text{INTERVAL III} \\ \sqrt{2}\, V_S \cos\theta & \left.\begin{array}{l}\left(-\pi < \theta < -\frac{\pi}{2}\right) \\ \left(\frac{\pi}{2} < \theta < \pi\right)\end{array}\right\} & \text{INTERVAL IV} \end{cases}$$

Here, $v_{1ref}$ represents the first voltage command value, $v_{2ref}$ represents the second voltage command value, $V_s$ represents the reference AC voltage, $V_{in}$ represents the voltage E1 of the DC power source 70 input to the power conditioner 100, and $\delta_1$ represents an interval with a width that is half the width of interval II.

During interval I, the switch control section 50 turns the first switch 12 and the second switch 14 ON and OFF in an alternating manner while the third switch 22 is ON and the fourth switch 24 is OFF. When the third switch 22 is ON, the fourth switch 24 is OFF, the first switch 12 is ON, and the second switch 14 is OFF, the potential of the second connection point 26 is the voltage E1 of the DC power source 70, which is the potential of the input terminal 61. Furthermore, when the third switch 22 is ON, the fourth switch 24 is OFF, the first switch 12 is OFF, and the second switch 14 is ON, the potential of the second connection point 26 is the ground potential GND. Accordingly, during interval I, a voltage having a repeating pulse waveform that alternates between the voltage E1 of the DC power source 70 and the ground potential GND is output from the second connection point 26.

During interval II, which follows interval I, the switch control section 50 turns the third switch 22 and the fourth switch 24 ON and OFF in an alternating manner while the first switch 12 is ON and the second switch 14 is OFF. When the first switch 12 is ON, the second switch 14 is OFF, the third switch 22 is ON, and the fourth switch 24 is OFF, the potential of the second connection point 26 is the voltage E1 of the DC power source 70. When the first switch 12 is ON, the second switch 14 is OFF, the third switch 22 is OFF, and the fourth switch 24 is ON, the potential of the second connection point 26 is the difference E1–E2 between the voltage E1 of the DC power source 70 and the voltage E2 of the second capacitor 32. Accordingly, during interval II, a voltage having a repeating pulse waveform that alternates between the voltage E1 of the DC power source 70 and the voltage difference E1–E2 is output from the second connection point 26.

After the third switch 22 and the fourth switch 24 are turned ON and OFF in an alternating manner while the first switch 12 is ON and the second switch 14 is OFF during interval II, during the following interval III, the switch control section 50 turns the first switch 12 and the second switch 14 ON and OFF in an alternating manner while the third switch 22 is ON and the fourth switch 24 is OFF, under the same conditions as used for interval I. As a result, during interval III, a voltage having a repeating pulse waveform that alternates between the voltage E1 of the DC power source 70 and the ground voltage GND is output from the second connection point 26.

After the first switch 12 and the second switch 14 are turned ON and OFF while the third switch 22 is ON and the fourth switch 24 is OFF during interval III, during the following interval IV, the switch control section 50 turns the third switch 22 and the fourth switch 24 ON and OFF in an alternating manner while the first switch 12 is OFF and the second switch 14 is ON. When the first switch 12 is OFF, the second switch 14 is ON, the third switch 22 is ON, and the fourth switch 24 is OFF, the potential of the second connection point 26 is the ground potential GND. When the first switch 12 is OFF, the second switch 14 is ON, the third switch 22 is OFF, and the fourth switch 24 is ON, the potential of the second connection point 26 is the potential –E2 at the other end of the second capacitor 32. Accordingly, during interval IV, a voltage having a repeating pulse waveform that alternates between the ground potential GND and the voltage potential –E2 is output from the second connection point 26.

In this way, the switch control section 50 performs PWM control by controlling the intervals during which each switch is ON and OFF, based on the respective switching conditions of the intervals, and converts the DC voltage from the DC power source 70 into AC voltage having a phase that is synchronized with the phase of the reference AC voltage.

The switch control section 50 determines the timing for switching between a state in which the first switch 12 and the second switch 14 are turned ON and OFF in an alternating manner while the third switch 22 is ON and the fourth switch 24 is OFF to a state in which the third switch 22 and the fourth switch 24 are turned ON and OFF in an alternating manner while the first switch 12 is ON and the second switch 14 is OFF, based on the voltage E1 of the DC power source 70 and the voltage E2 of the second capacitor 32. In other words, the switch control section 50 determines the timing for switching from interval I to interval II based on the voltage E1 of the DC power source 70 and the voltage E2 of the second capacitor 32.

More specifically, the switch control section 50 determines interval I to be the period from the zero-cross timing at which the reference AC voltage switches from negative to positive to the timing at which the reference AC voltage is E1–E2. In the same manner, the switch control section 50 determines the timing for switching from interval II to interval III based on the voltage E1 of the DC power source 70 and the voltage E2 of the second capacitor 32. More specifically, after switching to interval II, the switch control section 50 determines interval II to be a period lasting until the reference AC voltage again becomes E1–E2. The switch control section 50 then determines interval III to be a period from the timing at which the reference AC voltage again becomes E1–E2 to the zero-cross timing at which the reference AC voltage switches from positive to negative. Furthermore, the switch control section 50 determines interval IV to be a period from the zero-cross timing at which the reference AC voltage switches from positive to negative to the zero-cross timing at which the reference AC voltage switches from negative to positive.

Here, if the DC power source 70 is a solar cell, the power conditioner 100 alters the input voltage from the DC power source 70 in order to output the maximum power from the solar cell. Accordingly, the voltage E1 of the DC power source 70 fluctuates. Therefore, the switch control section 50 may acquire voltage information indicating the voltage E1 of the DC power source 70 from the first voltage sensor 34, for example. Furthermore, the switch control section 50 may acquire the voltage E2 of the second capacitor 32 stored in advance in a memory or the like provided to the power conditioner 100. The switch control section 50 calculates the difference E1–E2 between the voltage E1 and the voltage E2. The switch control section 50 references the predetermined voltage command value indicating the waveform of the reference AC voltage, calculates the time from the zero-cross timing at which the reference AC voltage switches from negative to positive to the timing at which the reference AC voltage becomes E1–E2, and sets this time as interval I. The switch control section 50 calculates the time from when the reference AC voltage becomes E1–E2 to the timing at which the reference AC voltage again becomes E1–E2, and sets this time as interval II.

If the voltage of the second capacitor 32 is a fixed value, each interval indicating the timing at which switching conditions are changed is determined using the voltage E1 of the DC power source 70 as a parameter. Accordingly, each interval may be calculated in advance for each magnitude of the voltage E1 and stored in a memory. In this case, the switch control section 50 references the memory and determines the time associated with the magnitude of the voltage E1 of the DC power source 70 measured by the first voltage sensor 34 to be the interval indicating the timing at which the switching conditions are to be changed.

On the other hand, if the input voltage from the DC power source 70 fluctuates, the voltage of the second capacitor 32 also fluctuates. Due to the voltage fluctuation of the second capacitor 32, there is a possibility that the output from the power conditioner 100 will become unstable. Therefore, in order to stabilize the output from the power conditioner 100, the voltage of the second capacitor 32 is preferably made constant. In order to achieve a constant voltage for the second capacitor 32, the average value $P_2$ of the power output from the second connection point 26 may be controlled to be zero, for example. Here, the effective value $V_{2f}$ of the fundamental frequency component of the output voltage from the second connection point 26 can be expressed as shown below.

Expression 5

$$V_{2f} = \frac{1}{\sqrt{2}} \frac{1}{\pi} \int_0^{2\pi} v_{2ref} \cos\theta d\theta$$

$$= \frac{\sqrt{2}}{\pi}\left\{-V_{in}\sin\delta_1 + \sqrt{2}\, V_S\left(\frac{\sin 2\delta_1}{4} + \frac{\delta_1}{2} + \frac{\pi}{4}\right)\right\}$$

By calculating a value for $\delta_1$ that results in the average value $P_2 = V_{2f} I = 0$, the average value $P_2$ of the power output from the second connection point 26 can be controlled to be zero, thereby stabilizing the output from the power conditioner 100. Here, the $\delta_1$ that results in the average value $P_2 = V_{2f} I = 0$ may be calculated using a third-order approximation, for example, and does not need to be calculated directly from the above Expression.

With Control Technique 2, the power conditioner 100 can be used for a single-phase two-wire, single-phase three-wire, three-phase three-wire, or three-phase four-wire power source. Furthermore, with Control Technique 2, when the third switch 22 and the fourth switch 24 are being turned ON and OFF in an alternating manner during interval II, the output voltage has a pulse waveform that alternates between the voltage E1 of the DC power source 70 and the voltage difference E1–E2. Accordingly, the switching loss in the third switch 22 and fourth switch 24 can be decreased by a greater amount than in a case where the output voltage has a pulse waveform that alternates between the voltage E1 of the DC power source 70 and the ground voltage GND. Furthermore, ripple current is input to the second capacitor 32 only during intervals II and IV. Accordingly, the generation of heat by the second capacitor 32 due to the input of ripple current can be restricted, and therefore deterioration of the second capacitor 32 can be restricted.

<Control Technique 3>

Figure 5:
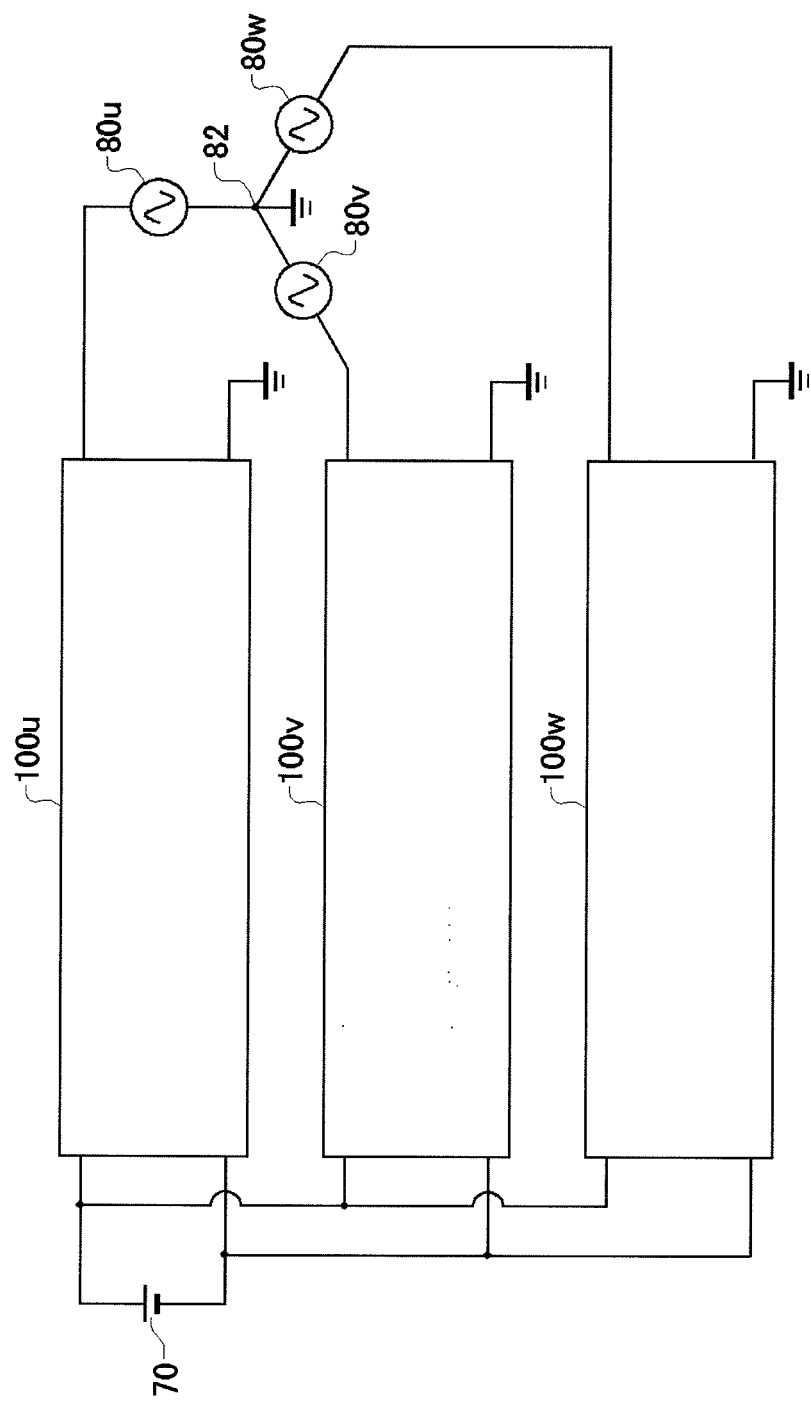
FIG. 5 shows a circuit configuration when the power conditioner is applied to a three-phase four-wire power source.

With Control Technique 3, the power conditioner 100 can be used for a three-phase AC power source having a three-phase three-wire or three-phase four-wire configuration. FIG. 5 shows a circuit configuration of the system when applied to a three-phase four-wire power source. The system includes power conditioners 100u, 100v, and 100w. The power conditioners 100u, 100v, and 100w are connected to a DC power source 70 and three-phase AC power sources 80u, 80v, and 80w. The power conditioner 100 shown in FIG. 1 can be used as each of the power conditioners 100u, 100v, and 100w.

Figure 6:
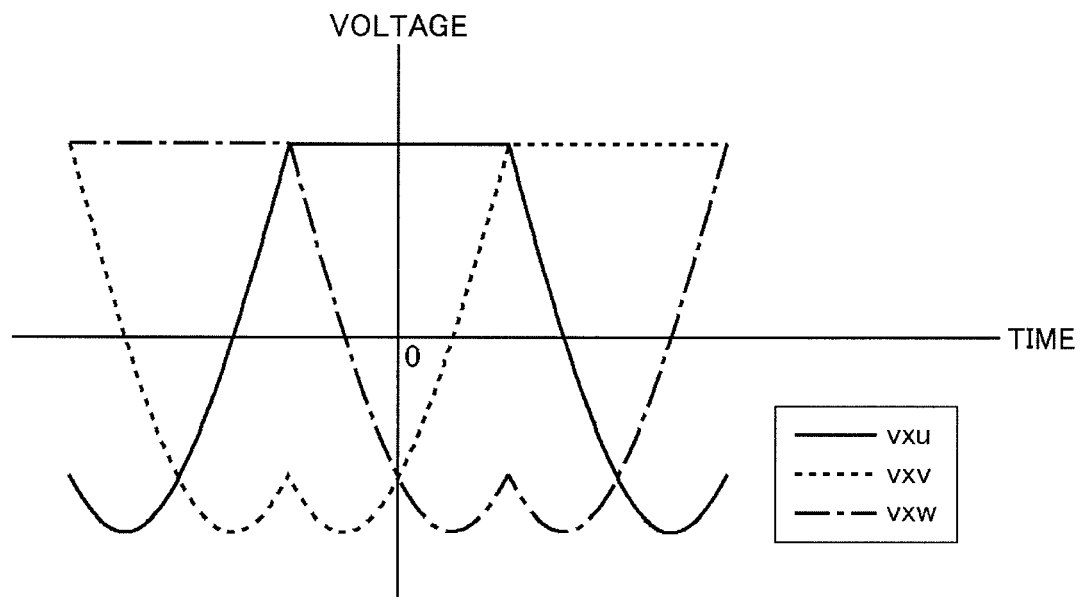
FIG. 6 shows exemplary voltage waveforms output from a power conditioner for each phase when applied in a three-phase four-wire power source.

If a three-phase three-wire or three-phase four-wire power source is used, the voltage usage efficiency of the DC power source 70 can be improved by using a third-order harmonic. Therefore, in Control Technique 3, the switch control section 50 turns the first switch 12, the second switch 14, the third switch 22, and the fourth switch 24 ON and OFF such that the phase output voltages vxu, vxv, and vxw output respectively from the power conditioners 100u, 100v, and 100w have voltage waveforms such as shown in FIG. 6. Each voltage waveform shown in FIG. 6 represents a voltage waveform obtained by adding an offset voltage $v_f$ to a voltage waveform obtained by subtracting the maximum phase voltage from the three-phase power source voltage in a three-phase four-wire configuration.

Figure 7A:
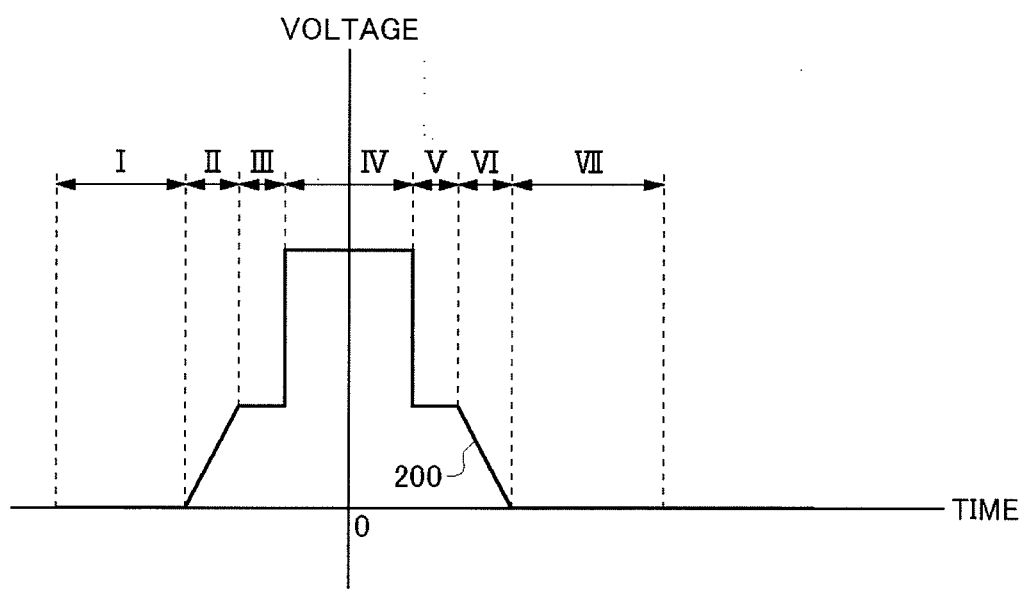
FIG. 7A shows an exemplary first voltage command value used in Control Technique 3.
Figures 7B, 8:
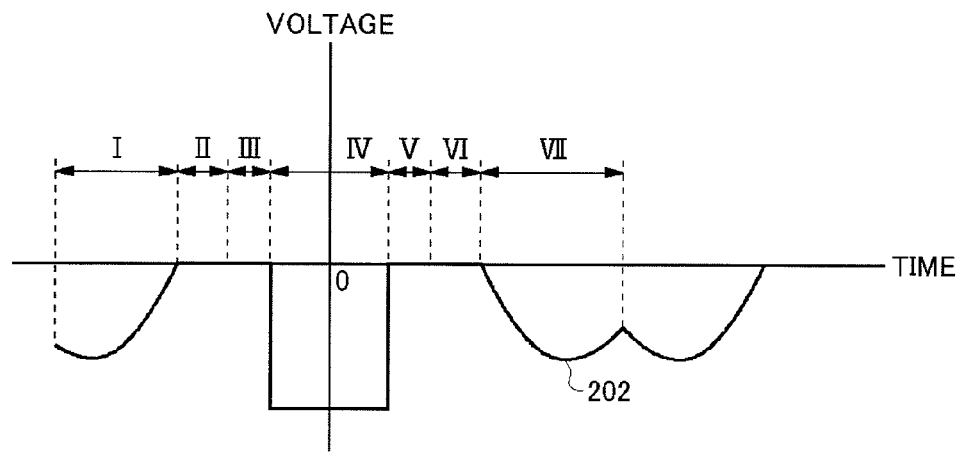
FIG. 7B shows an exemplary second voltage command value used in Control Technique 3.
FIG. 8 shows exemplary switching conditions for each of the switches in Control Technique 3.
Figure 9A:
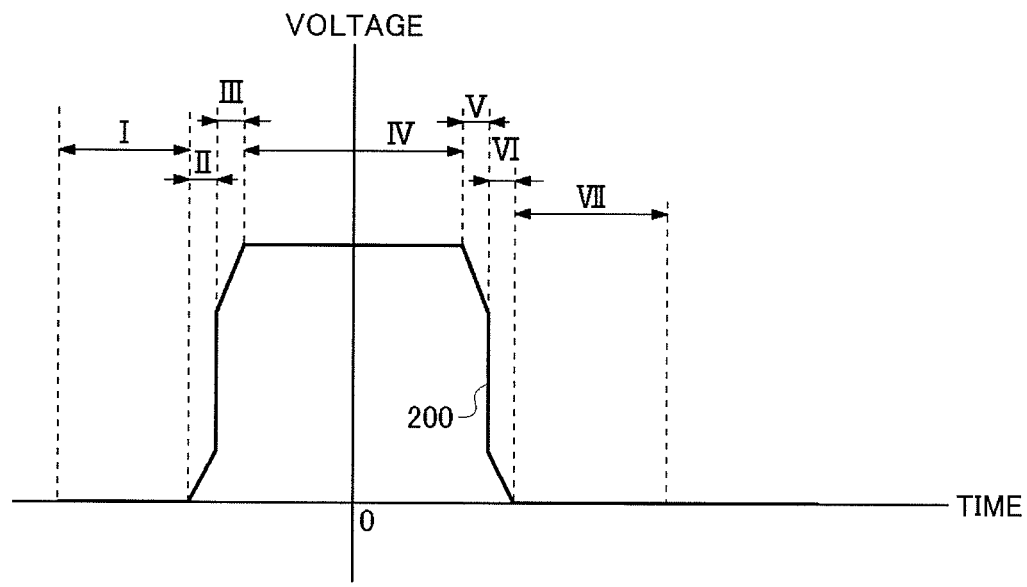
FIG. 9A shows an exemplary first voltage command value used in Control Technique 3.
Figure 9B:
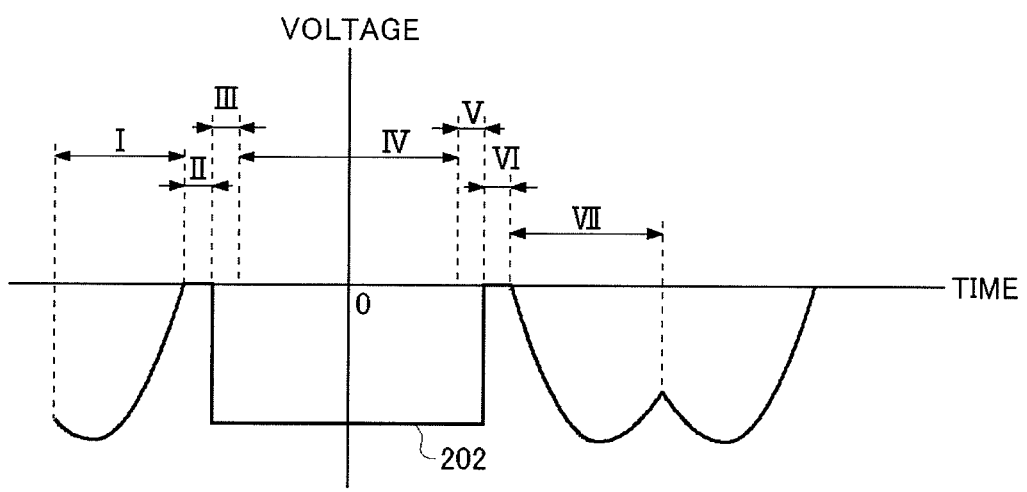
FIG. 9B shows an exemplary second voltage command value used in Control Technique 3.

The switch control section 50 converts the DC voltage from the DC power source 70 into AC voltage by turning the first switch 12, the second switch 14, the third switch 22, and the fourth switch 24 ON and OFF according to ON/OFF conditions, such as shown in FIG. 8, during each of the intervals I, II, III, IV, V, VI, and VII, based on the first voltage command value 200 shown in FIG. 7A and the second voltage command value 202 shown in FIG. 7B. As another example, the switch control section 50 converts the DC voltage from the DC power source 70 into AC voltage by turning the first switch 12, the second switch 14, the third switch 22, and the fourth switch 24 ON and OFF according to ON/OFF conditions, such as shown in FIG. 10, during each of the intervals I, II, III, IV, V, VI, and VII, based on the first voltage command value 200 shown in FIG. 9A and the second voltage command value 202 shown in FIG. 9B. FIGS. 7A and 7B show the voltage command value when $\delta_1$ is less than or equal to $\pi/3$ (when interval IV is no greater than $2\pi/3$), and FIGS. 9A and 9B show the voltage command value when $\delta_1$ is greater than $\pi/3$ (when interval IV is less than $2\pi/3$).

With Control Technique 3, the first voltage command value 200 when $\delta_1$ is less than or equal to $\pi/3$ (when interval IV is no greater than $2\pi/3$) can be expressed in each of the intervals I to VII as shown below. The switch control section 50 performs PWM control of the first switch 12 and the second switch 14 in intervals II, III, V, and VI based on the first voltage command value 200.

Expression 6

$$u\_v_{1ref} = \begin{cases} 0 & (-\pi < \theta < -\varphi) \\ \sqrt{2}\,V_S\cos\theta - \sqrt{2}\,V_S\cos\left(\theta + \frac{2}{3}\pi\right) + v_f & \left(-\varphi < \theta < -\frac{\pi}{3}\right) \\ v_f & \left(-\frac{\pi}{3} < \theta < -\delta_1\right) \\ V_{in} & (-\delta_1 < \theta < \delta_1) \\ v_f & \left(\delta_1 < \theta < \frac{\pi}{3}\right) \\ \sqrt{2}\,V_S\cos\theta - \sqrt{2}\,V_S\cos\left(\theta - \frac{2}{3}\pi\right) + v_f & \left(\frac{\pi}{3} < \theta < \varphi\right) \\ 0 & (\varphi < \theta < \pi) \end{cases}$$

Furthermore, with Control Technique 3, the second voltage command value 202 when $\delta_1$ is less than or equal to $\pi/3$ (when interval IV is no greater than $2\pi/3$) can be expressed in each of the intervals I to VII as shown below. The switch control section 50 performs PWM control of the third switch 22 and the fourth switch 24 in intervals I and VII based on the second voltage command value 202.

Expression 7

$$u\_v_{2ref} = \begin{cases} \sqrt{2}\,V_S\cos\theta - \sqrt{2}\,V_S\cos\left(\theta + \frac{2}{3}\pi\right) + v_f & (-\pi < \theta < -\varphi) \\ 0 & \left(-\varphi < \theta < -\frac{\pi}{3}\right) \\ 0 & \left(-\frac{\pi}{3} < \theta < -\delta_1\right) \\ -V_{in} + v_f & (-\delta_1 < \theta < \delta_1) \\ 0 & \left(\delta_1 < \theta < \frac{\pi}{3}\right) \\ 0 & \left(\frac{\pi}{3} < \theta < \varphi\right) \\ \sqrt{2}\,V_S\cos\theta - \sqrt{2}\,V_S\cos\left(\theta - \frac{2}{3}\pi\right) + v_f & (\varphi < \theta < \pi) \end{cases}$$

Here, $v_{1ref}$ represents the first voltage command value, $v_{2ref}$ represents the second voltage command value, $V_s$ represents the reference AC voltage, $V_{in}$ represents the voltage E1 of the DC power source 70 input to the power conditioner 100, and $\delta_1$ represents an interval with a width that is half the width of interval II. Furthermore, $v_f$ represents the offset voltage, $\phi$ represents the $\theta$ that results in the u-phase output vxu equaling 0, and $\phi$ can be calculated using the following Expression.

Expression 8

$$\varphi = \sin^{-1}\left(\frac{v_f}{\sqrt{6}\,V_S}\right) + \frac{\pi}{3}$$

When $\delta_1$ is less than or equal to $\pi/3$, during interval I, the switch control section 50 turns the third switch 22 and the fourth switch 24 ON and OFF in an alternating manner while the first switch 12 is OFF and the second switch 14 is ON. After the third switch 22 and the fourth switch 24 are turned ON and OFF in an alternating manner while the first switch 12 is OFF and the second switch 14 is ON during Interval I, during the following intervals II and III, the switch control section 50 turns the first switch 12 and the second switch 14 ON and OFF in an alternating manner while the third switch 22 is ON and the fourth switch 24 is OFF.

After the first switch 12 and the second switch 14 are turned ON and OFF in an alternating manner while the third switch 22 is ON and the fourth switch 24 is OFF, during interval IV that follows interval III, the switch control section 50 turns ON the first switch 12, turns OFF the second switch 14, turns OFF the third switch 22, and turns ON the fourth switch 24, and keeps the switches in this state. After the first switch 12 is turned ON, the second switch 14 is turned OFF, the third switch 22 is turned OFF, and the fourth switch 24 is turned ON, during intervals V and VI that follow interval IV, the switch control section 50 turns the first switch 12 and the second switch 14 ON and OFF in an alternating manner while the third switch 22 is ON and the fourth switch 24 is OFF.

After the first switch 12 and the second switch 14 are turned ON and OFF in an alternating manner while the third switch 22 is ON and the fourth switch 24 is OFF, during interval VII that follows interval VI, the switch control section 50 turns the third switch 22 and the fourth switch 24 ON and OFF in an alternating manner while the first switch 12 is OFF and the second switch 14 is ON.

With Control Technique 3, the first voltage command value 200 when $\delta_1$ is greater than $\pi/3$ (when interval IV is greater than $2\pi/3$) can be expressed as shown below for each of the intervals I to VII. The switch control section 50 performs PWM control of the first switch 12 and the second switch 14 during intervals II, III, V, and VI based on the first voltage command value 200.

Expression 9

$$u\_v_{1ref} = \begin{cases} 0 & (-\pi < \theta < -\varphi) \\ \sqrt{2}\,V_S\cos\theta - \sqrt{2}\,V_S\cos\left(\theta + \frac{2}{3}\pi\right) + v_f & (-\varphi < \theta < -\delta_1) \\ \sqrt{2}\,V_S\cos\theta - \sqrt{2}\,V_S\cos\left(\theta + \frac{2}{3}\pi\right) + V_{in} & \left(-\delta_1 < \theta < -\frac{\pi}{3}\right) \\ V_{in} & \left(-\frac{\pi}{3} < \theta < \frac{\pi}{3}\right) \\ \sqrt{2}\,V_S\cos\theta - \sqrt{2}\,V_S\cos\left(\theta - \frac{2}{3}\pi\right) + V_{in} & \left(\frac{\pi}{3} < \theta < \delta_1\right) \\ \sqrt{2}\,V_S\cos\theta - \sqrt{2}\,V_S\cos\left(\theta - \frac{2}{3}\pi\right) + v_f & (\delta_1 < \theta < \varphi) \\ 0 & (\varphi < \theta < \pi) \end{cases}$$

Furthermore, with Control Technique 3, the second voltage command value 202 when $\delta_1$ is greater than $\pi/3$ (when interval IV is greater than $2\pi/3$) can be expressed as shown below for each of the intervals I to VII. The switch control section 50 performs PWM control of the third switch 22 and the fourth switch 24 during intervals I and VII based on the second voltage command value 202.

Expression 10

$$u\_v_{2ref} = \begin{cases} \sqrt{2}\,V_S\cos\theta - \sqrt{2}\,V_S\cos\left(\theta + \frac{2}{3}\pi\right) + v_f & (-\pi < \theta < -\varphi) \\ 0 & (-\varphi < \theta < -\delta_1) \\ -V_{in} + v_f & \left(-\delta_1 < \theta < -\frac{\pi}{3}\right) \\ -V_{in} + v_f & \left(-\frac{\pi}{3} < \theta < \frac{\pi}{3}\right) \\ -V_{in} + v_f & \left(\frac{\pi}{3} < \theta < \delta_1\right) \\ 0 & (\delta_1 < \theta < \varphi) \\ \sqrt{2}\,V_S\cos\theta - \sqrt{2}\,V_S\cos\left(\theta - \frac{2}{3}\pi\right) + v_f & (\varphi < \theta < \pi) \end{cases}$$

When $\delta_1$ is greater than $\pi/3$, during interval I, the switch control section 50 turns the third switch 22 and the fourth switch 24 ON and OFF in an alternating manner while the first switch 12 is OFF and the second switch 14 is ON. After the third switch 22 and the fourth switch 24 are turned ON and OFF in an alternating manner while the first switch 12 is OFF and the second switch 14 is ON during Interval I, during the following interval II, the switch control section 50 turns the first switch 12 and the second switch 14 ON and OFF in an alternating manner while the third switch 22 is ON and the fourth switch 24 is OFF.

After the first switch 12 and the second switch 14 are turned ON and OFF in an alternating manner while the third switch 22 is ON and the fourth switch 24 is OFF, during interval III that follows interval II, the switch control section 50 turns the first switch 12 and the second switch 14 ON and OFF in an alternating manner, while the third switch 22 is OFF and the fourth switch 24 is ON. After the first switch 12 and the second switch 14 are turned ON and OFF in an alternating manner while the third switch 22 is OFF and the fourth switch 24 is ON, during interval IV that follows interval III, the switch control section 50 turns ON the first switch 12, turns OFF the second switch 14, turns OFF the third switch 22, and turns ON the fourth switch 24, and keeps the switches in this state.

After the first switch 12 is turned ON, the second switch 14 is turned OFF, the third switch 22 is turned OFF, and the fourth switch 24 is turned ON, during interval V that follows interval IV, the switch control section 50 turns the first switch 12 and the second switch 14 ON and OFF in an alternating manner while the third switch 22 is OFF and the fourth switch 24 is ON. After the first switch 12 and the second switch 14 are turned ON and OFF in an alternating manner while the third switch 22 is OFF and the fourth switch 24 is ON, during interval VI that follows interval V, the switch control section 50 turns the first switch 12 and the second switch 14 ON and OFF in an alternating manner while the third switch 22 is ON and the fourth switch 24 is OFF.

After the first switch 12 and the second switch 14 are turned ON and OFF in an alternating manner while the third switch 22 is ON and the fourth switch 24 is OFF, during interval VII that follows interval VI, the switch control section 50 turns the third switch 22 and the fourth switch 24 ON and OFF in an alternating manner while the first switch 12 is OFF and the second switch 14 is ON.

Control Technique 3 differs from Control Technique 2 in that the AC voltage output from the smoothing circuit 40 is obtained by shifting the reference AC voltage in a positive direction by a predetermined potential (offset voltage $v_f$) from the reference potential of the reference AC voltage with which the AC voltage is to be phase-synchronized. With Control Technique 3, the sum of the voltage E1 and the voltage E2 need only be greater than or equal to the reference AC voltage Vp-p, which is the AC voltage of the system power source 80. Accordingly, compared to Control Technique 2, the voltage E1 and the voltage E2 can be lower. Therefore, the switching loss can be further decreased.

In the same manner as Control Technique 2, in order to stabilize the output from the power conditioners 100u, 100v, and 100w, the voltage of each second capacitor 32 is preferably made constant. In order to achieve a constant voltage for a second capacitor 32, the average value $P_2$ of the power output from the second connection point 26 may be controlled to be zero, for example. In Control Technique 3, the effective value $V_{2f}$ of the fundamental frequency component of the output voltage from each second connection point 26 can be expressed as shown below.

Expression 11

$$V_{2f} = \frac{1}{\sqrt{2}} \frac{1}{\pi} \int_0^{2\pi} v_{2ref}\cos\theta\,d\theta$$

$$= \frac{\sqrt{2}}{\pi}\left\{ \begin{array}{l} (-V_{in} + v_f)\sin\delta_1 + \frac{3\sqrt{2}\,V_S}{4}\pi + \frac{\sqrt{6}\,V_S}{8} - \frac{\sqrt{2}\,V_S}{4}\sin 2\varphi + \\ \frac{3\sqrt{2}\,V_S}{4}\varphi + \frac{\sqrt{2}\,V_S}{4}\sin\left(2\varphi - \frac{2}{3}\pi\right) + v_f \sin\varphi \end{array} \right\}$$

By calculating a value for $\delta_1$ that results in the average value $P_2=V_{2f}I=0$, the average value P2 of the power output from the second connection point 26 can be controlled to be zero, thereby stabilizing the output from the power conditioner 100. By expanding $\delta_1$ in the above Expression, the following Expression can be formed.

Expression 12

$$\delta_1 = \sin^{-1}\frac{\frac{3\sqrt{2}\,V_S}{4}\pi + \frac{\sqrt{6}\,V_S}{8} - \frac{\sqrt{2}\,V_S}{4}\sin 2\varphi + \frac{3\sqrt{2}\,V_S}{4}\varphi + \frac{\sqrt{2}\,V_S}{4}\sin\left(2\varphi - \frac{2}{3}\pi\right) + v_f\sin\varphi}{V_{in} - v_f}$$

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An inverter apparatus comprising:
    a first switch group that is connected to a DC power source and includes a first switch and a second switch connected in series;
    a capacitor that has one end thereof connected to a first connection point between the first switch and the second switch;
    a second switch group that is connected in parallel with the capacitor and includes a third switch and a fourth switch that are connected in series;
    a switch control section that controls an ON/OFF state of the first switch, the second switch, the third switch, and the fourth switch to convert DC voltage from the DC power source into AC voltage and output the AC voltage from a second connection point between the third switch and the fourth switch; and
    a smoothing circuit that is connected to the second connection point and normalizes a pulse waveform of the AC voltage, wherein
    after turning the first switch and the second switch ON and OFF in an alternating manner and turning the third switch and the fourth switch ON and OFF in an alternating manner, the switch control section turns the third switch and the fourth switch ON and OFF in an alternating manner while the first switch stays OFF and the second switch stays ON.

2. A solar power generation system comprising:
    a solar cell; and
    the inverter apparatus of claim 1 that converts DC voltage from the solar cell into AC voltage.

3. An inverter apparatus comprising:
    a first switch group that is connected to a DC power source and includes a first switch and a second switch connected in series;
    a capacitor that has one end thereof connected to a first connection point between the first switch and the second switch;
    a second switch group that is connected in parallel with the capacitor and includes a third switch and a fourth switch that are connected in series;
    a switch control section that controls an ON/OFF state of the first switch, the second switch, the third switch, and the fourth switch to convert DC voltage from the DC power source into AC voltage and output the AC voltage from a second connection point between the third switch and the fourth switch; and
    a smoothing circuit that is connected to the second connection point and normalizes a pulse waveform of the AC voltage, wherein
    the switch control section turns the first switch and the second switch ON and OFF in an alternating manner while the third switch stays ON and the fourth switch stays OFF, and turns the third switch and the fourth switch ON and OFF in an alternating manner while the first switch stays ON and the second switch stays OFF.

4. The inverter apparatus according to claim 3, wherein after turning the third switch and the fourth switch ON and OFF in an alternating manner while the first switch stays ON and the second switch stays OFF, the switch control section turns the first switch and the second switch ON and OFF in an alternating manner while the third switch stays ON and the fourth switch stays OFF.

5. The inverter apparatus according to claim 4, wherein after turning the first switch and the second switch ON and OFF in an alternating manner while the third switch stays ON and the fourth switch stays OFF, the switch control section turns the third switch and the fourth switch ON and OFF in an alternating manner while the first switch stays OFF and the second switch stays ON.

6. The inverter apparatus according to claim 3, further comprising a voltage measuring section that measures voltage of a system power source connected on the output side of the smoothing circuit, wherein
    the switch control section determines a timing for switching from an operation of turning the first switch and the second switch ON and OFF in an alternating manner while the third switch stays ON and the fourth switch stays OFF to an operation of turning the third switch and the fourth switch ON and OFF in an alternating manner while the first switch stays ON and the second switch stays OFF, based on the voltage of the system power source.

7. A solar power generation system comprising:
    a solar cell; and
    the inverter apparatus of claim 3 that converts DC voltage from the solar cell into AC voltage.

8. An inverter apparatus comprising:
    a first switch group that is connected to a DC power source and includes a first switch and a second switch connected in series;
    a capacitor that has one end thereof connected to a first connection point between the first switch and the second switch;
    a second switch group that is connected in parallel with the capacitor and includes a third switch and a fourth switch that are connected in series;
    a switch control section that controls an ON/OFF state of the first switch, the second switch, the third switch, and the fourth switch to convert DC voltage from the DC power source into AC voltage and output the AC voltage from a second connection point between the third switch and the fourth switch; and
    a smoothing circuit that is connected to the second connection point and normalizes a pulse waveform of the AC voltage, wherein
    the inverter apparatus is connected to a three-phase AC power source, and
    the switch control section controls the ON/OFF state of the first switch, the second switch, the third switch, and the fourth switch to output from the smoothing circuit shifted AC voltage obtained by shifting a reference AC voltage, with which the AC voltage is to be phase-synchronized, in a positive direction by a predetermined potential, from a reference potential of the reference AC voltage.

9. The inverter apparatus according to claim 8, wherein after turning the third switch and the fourth switch ON and OFF in an alternating manner while the first switch stays OFF and the second switch stays ON, the switch control section turns the first switch and the second switch ON and OFF in an alternating manner while the third switch stays ON and the fourth switch stays OFF.

10. The inverter apparatus according to claim 9, wherein after turning the first switch and the second switch ON and OFF in an alternating manner while the third switch stays ON and the fourth switch stays OFF, the switch control section turns ON the first switch, turns OFF the second switch, turns OFF the third switch, turns ON the fourth switch, and maintains the switches in this state.

11. The inverter apparatus according to claim 10, wherein if the state in which the first switch is ON, the second switch is OFF, the third switch is OFF, and the fourth switch is ON is maintained for an interval greater than $2\pi/3$, the switch control section turns the first switch and the second switch ON and OFF in an alternating manner while the third switch stays ON and the fourth switch stays OFF and then, after turning the first switch and the second switch ON and OFF in an alternating manner while the third switch stays OFF and the fourth switch stays ON, turns ON the first switch, turns OFF the second switch, turns OFF the third switch, turns ON the fourth switch, and maintains the switches in this state.

12. The inverter apparatus according to claim 10, wherein after maintaining the state in which the first switch is ON, the second switch is OFF, the third switch is OFF, and the fourth switch is ON, the switch control section turns the first switch and the second switch ON and OFF in an alternating manner while the third switch stays ON and the fourth switch stays OFF.

13. The inverter apparatus according to claim 12, wherein if the state in which the first switch is ON, the second switch is OFF, the third switch is OFF, and the fourth switch is ON is maintained for an interval greater than $2\pi/3$, the switch control section turns ON the first switch, turns OFF the second switch, turns OFF the third switch, turns ON the fourth switch, maintains the switches in this state and then, after turning the first switch and the second switch ON and OFF in an alternating manner while the third switch stays OFF and the fourth switch stays ON, turns the first switch and the second switch ON and OFF in an alternating manner while the third switch stays ON and the fourth switch stays OFF.

14. The inverter apparatus according to claim 12, wherein after turning the first switch and the second switch ON and OFF in an alternating manner while the third switch stays ON and the fourth switch stays OFF, the switch control section turns the third switch and the fourth switch ON and OFF in an alternating manner while the first switch stays OFF and the second switch stays ON.

15. A solar power generation system comprising:
a solar cell; and
the inverter apparatus of claim 8 that converts DC voltage from the solar cell into AC voltage.

\* \* \* \* \*